(12) United States Patent
Ramanarayanan et al.

(10) Patent No.: US 11,238,844 B1
(45) Date of Patent: Feb. 1, 2022

(54) AUTOMATIC TURN-LEVEL LANGUAGE IDENTIFICATION FOR CODE-SWITCHED DIALOG

(71) Applicant: Educational Testing Service, Princeton, NJ (US)

(72) Inventors: Vikram Ramanarayanan, San Francisco, CA (US); Robert Pugh, San Jose, CA (US); Yao Qian, Dublin, CA (US); David Suendermann-Oeft, San Francisco, CA (US)

(73) Assignee: Educational Testing Service, Princeton, NJ (US)

( * ) Notice: Subject to any disclaimer, the term of this patent is extended or adjusted under 35 U.S.C. 154(b) by 143 days.

(21) Appl. No.: 16/255,220

(22) Filed: Jan. 23, 2019

Related U.S. Application Data (60) Provisional application No. 62/620,530, filed on Jan. 23, 2018.

(51) Int. Cl.

| | |
|---|---|
| *G10L 15/05* | (2013.01) |
| *G10L 15/00* | (2013.01) |
| *G10L 25/24* | (2013.01) |
| *G10L 15/22* | (2006.01) |
| *G10L 15/06* | (2013.01) |
| *G10L 15/16* | (2006.01) |

(52) U.S. Cl.
CPC .......... *G10L 15/005* (2013.01); *G10L 15/063* (2013.01); *G10L 15/16* (2013.01); *G10L 15/22* (2013.01); *G10L 25/24* (2013.01)

(58) Field of Classification Search
CPC ..... G10L 15/22; G10L 15/063; G10L 15/005; G10L 15/18; G10L 15/26
See application file for complete search history.

(56) References Cited

U.S. PATENT DOCUMENTS

| | | | |
|---|---|---|---|
| 6,847,714 B2 * | 1/2005 | Das .................... | H04M 3/5233 379/221.01 |
| 10,255,907 B2 * | 4/2019 | Nallasamy ............. | G10L 15/16 |
| 2009/0055162 A1 * | 2/2009 | Qian ...................... | G10L 13/06 704/8 |

(Continued)

OTHER PUBLICATIONS

Djellab, Mourad, et al. "Algerian Modern Colloquial Arabic Speech Corpus (AMCASC): regional accents recognition within complex socio-linguistic environments." Language Resources and Evaluation 51.3 (2017): 613-641. (Year: 2016).*

(Continued)

*Primary Examiner* — Mark Villena
(74) *Attorney, Agent, or Firm* — Jones Day (57) ABSTRACT

Systems and methods for identifying a person's native language and/or non-native language based on code-switched text and/or speech, are presented. The systems may be trained using various methods. For example, a language identification system may be trained using one or more code-switched corpora. Text and/or speech features may be extracted from the corpora and used, in combination with a per-word language identify of the text and/or speech, to train at least one machine learner. Code-switched text and/or speech may be received and processed by extracting text and/or speech features. These features may be fed into the at least one machine learner to identify the person's native language.

8 Claims, 8 Drawing Sheets

(56) References Cited

U.S. PATENT DOCUMENTS

| | | | | |
|---|---|---|---|---|
| 2017/0287474 | A1* | 10/2017 | Maergner | G10L 13/08 |
| 2018/0137109 | A1* | 5/2018 | Mangoubi | G10L 15/142 |
| 2019/0197119 | A1* | 6/2019 | Zhang | G06F 40/49 |

OTHER PUBLICATIONS

Zhang, Chunlei, et al. "Joint information from nonlinear and linear features for spoofing detection: An i-vector/DNN based approach." 2016 IEEE International Conference on Acoustics, Speech and Signal Processing (ICASSP). IEEE, 2016. (Year: 2016).*

Siddhant, Aditya, Preethi Jyothi, and Sriram Ganapathy. "Leveraging native language speech for accent identification using deep siamese networks." 2017 IEEE Automatic Speech Recognition and Understanding Workshop (ASRU). IEEE, 2017. (Year: 2017).*

Milroy, Lesley, Muysken, Pieter; One Speaker, Two Languages: Cross-Disciplinary Perspectives on Code-Switching; Cambridge University Press; 1995.

Wei, Li; The Bilingualism Reader; Psychology Press; 2000.

MacSwan, J.; Code Switching and Grammatical Theory; The Handbook of Bilingualism, 46; p. 283; 2004.

Myers-Scotton, Carol; Codeswitching with English: Types of Switching, Types of Communities; World Englishes: Critical Concepts in Linguistics, 8(3); pp. 333-346; 1989.

O'Connor, Brendan, Crawford, Layne; An Art of Being in Between: The Promise of Hybrid Language Practices; Research on Preparing Inservice Teachers to Work Effectively with Emergent Bilinguals, 24; p. 149-173; 2015.

Wheeler, Rebecca; Becoming Adept at Code-Switching; Educational Leadership 65(7); pp. 54-58; Apr. 2008.

Jiang, Yih-Lin Belinda; Garcia, Georgia Earnest; Willis, Arlette Ingram; Code-Mixing as a Bilingual Instructional Strategy; Bilingual Research Journal, 37(3); pp. 311-326; Dec. 2014.

Ahmad, Badrul Hisham, Jusoff, Kamaruzaman; Teachers' Code-Switching in Classroom Instructions for Low English Proficient Learners; English Language Teaching, 2(2); pp. 49-55; Jun. 2009.

Littlewood, William, Yu, Baohua; First Language and Target Language in the Foreign Language Classroom; Language Teaching, 44(1); pp. 64-77; Jan. 2011.

Solorio, Thamar, Blair, Elizabeth, Maharjan, Suraj, Bethard, Steven, Diab, Mona, Gohneim, Mahmoud, Hawwari, Abdelati, Aighamdi, Fahad, Hirschberg, Julia, Chang, Alison, Fung, Pascale; Overview for the First Shared Task on Language Identification in Code-Switched Data; Proceedings of the First Workshop on Computational Approaches to Code Switching; Doha, Qatar; pp. 62-72; Oct. 2014.

Bali, Kalika, Sharma, Jatin, Choudhury, Monojit, Vyas, Yogarshi; I Am Borrowing Ya Mixing?: An Analysis of English-Hindi Code Mixing in Facebook; Proceedings of the First Workshop on Computational Approaches to Code Switching; Doha, Qatar; pp. 116-126; Oct. 2014.

Molina, Giovanni, Rey-Villamizar, Nicolas, Solorio, Thamar, Aighamdi, Fahad, Ghoneim, Mahmoud, Hawwari, Abdelati, Diab, Mona; Overview for the Second Shared Task on Language Identification in Code-Switched Data; Proceedings of the 2nd Workshop on Computational Approaches to Code Switching; Austin, TX; pp. 40-49; Nov. 2016.

Solorio, Thamar, Liu, Yang; Learning to Predict Code-Switching Points; Proceedings of the Conference on Empirical Methods in Natural Language Processing; Honolulu, HI; pp. 973-981; Oct. 2008.

Barman, Utsab, Das, Amitava, Wagner, Joachim, Foster, Jennifer; Code Mixing: A Challenge for Language Identification in the Language of Social Media; Proceedings of the 1st Workshop on Computational Approaches to Code Switching; Doha, Qatar; pp. 13-23; Oct. 2014.

King, Ben, Abney, Steven; Labeling the Languages of Words in Mixed-Language Documents Using Weakly Supervised Methods; Proceedings of NAACL-HLT; Atlanta, GA; pp. 1110-1119; Jun. 2013.

Piergallini, Mario, Shirvani, Rouzbeh, Gautam, Gauri, Chouikha, Mohamed; The Howard University System Submission for the Shared Task in Language Identification in Spanish-English Codeswitching; Proceedings of the 2nd Workshop on Computational Approaches to Code Switching; Austin, TX; pp. 116-120; Nov. 2016.

Samih, Younes, Maharjan, Suraj, Attia, Mohammed, Kallmeyer, Laura, Solorio, Thamar; Multilingual Code-Switching Identification via LSTM Recurrent Neural Networks; Proceedings of the 2nd Workshop on Computational Approaches to Code Switching; Austin, TX; pp. 50-59; Nov. 2016.

Li, Ying, Yu, Yue, Fung, Pascale; A Mandarin-English Code-Switching Corpus; LREC; pp. 2515-2519; 2012.

Lyu, Dau-Cheng, Tan, Tien-Ping, Chng, Eng-Siong, Li, Haizhou; SEAME: A Mandarin-English Code-Switching Speech Corpus in South-East Asia; Language Resources and Evaluation, 49(3); pp. 581-600; 2015.

Chan, Joyce, Ching, P.C., Lee, Tan; Development of a Cantonese-English Code-Mixing Speech Corpus; INTERSPEECH; pp. 1533-1536; Sep. 2005.

Dey, Anik, Fung, Pascale; A Hindi-English Code-Switching Corpus; LREC; pp. 2410-2413; 2010.

Donnelly, Kevin, Deuchar, Margaret; The Bangor Autoglosser: A Multilingual Tagger for Conversational Text; ITA11; Wrexham, Wales; 2011.

Ramanarayanan, Vikram, Suendermann-Oeft, David; Jee haan, I'd like both, por favor: Elicitation of a Code-Switched Corpus of Hindi-English and Spanish-English Human-Machine Dialog; INTERSPEECH; Stockholm, Sweden; pp. 47-51; Aug. 2017.

Vu, Ngoc Thang, Lyu, Dau-Cheng, Weiner, Jochen, Telaar, Dominic, Schlippe, Tim, Blaicher, Fabian, Chng, Eng-Siong, Schultz, Tanja, Li, Haizhou; A First Speech Recognition System for Mandarin-English Code-Switch Conversational Speech; IEEE International Conference on Acoustics, Speech and Signal Processing (ICASSP); pp. 4889-4892; 2012.

Yeh, Ching-Feng, Sun, Liang-Che, Huang, Chao-Yu, Lee, Lin-Shan; Bilingual Acoustic Modeling with State Mapping and Three-Stage Adaptation for Transcribing Unbalanced Code-Mixed Lectures; IEEE International Conference on Acoustics, Speech and Signal Processing (ICASSP); pp. 5020-5023; May 2011.

Eyben, Florian, Weninger, Felix, Gross, Florian, Schuller, Bjorn; Recent Developments in openSMILE, the Munich Open-Source Multimedia Feature Extractor; Proceedings of the 21st ACM International Conference on Multimedia; pp. 835-838; 2013.

Qian, Yao, Evanini, Keelan, Wang, Xinhao, Suendermann-Oeft, David, Pugh, Robert, Lange, Patrick, Molloy, Hillary, Soong, Frank; Improving Sub-Phone Modeling for Better Native Language Identification with Non-Native English Speech; INTERSPEECH, Stockholm, Sweden; pp. 2586-2590; Aug. 2017.

Povey, Daniel, Ghoshal, Amab, Boulianne, Gilles, Burget, Lukas, Glembek, Ondrej, Goel, Nagendra, Hannemann, Mirko, Motlicek, Petr, Qian, Yanmin, Schwarz, Petr, Silovsky, Jan, Stemmer, Georg, Vesely, Karel; The Kaldi Speech Recognition Toolkit; Proceedings of the ASRU Workshop; 2011.

Cieri, Christopher, Miller, David, Walker, Kevin; The Fisher Corpus: a Resource for the Next Generation of Speech-to-Text; LREC, 4; pp. 69-71; 2004.

Chawla, Nitesh, Bowyer, Kevin, Hall, Lawrence, Kegelmeyer, W. Philip; SMOTE: Synthetic Minority Over-Sampling Technique; Journal of Artificial Intelligence Research, 16; pp. 321-357; Jun. 2002.

* cited by examiner

AUTOMATIC TURN-LEVEL LANGUAGE IDENTIFICATION FOR CODE-SWITCHED DIALOG

CROSS-REFERENCE TO RELATED APPLICATIONS

This application claims priority to U.S. Provisional Application No. 62/620,530, filed Jan. 23, 2018, the entirety of which is incorporated by reference herein.

TECHNICAL FIELD

The technology described herein relates to language identification and more particularly, to language identification in code-switched text and speech.

BACKGROUND

"Code-switching" refers to a multilingual speaker's alternating use of two or more languages or language varieties within the context of a single conversation or discourse in a manner consistent with the syntax and phonology of each variety. As globalization increases and multilingual societies continue to rise around the world, the processing of code-switched text and speech becomes increasingly important.

Language identification ("LID") in code-switched text and speech has applications in multiple domains, including consumer/home electronics and business applications. So too, eliciting and processing code-switched or "crutched" language has applications in the education domain, specifically language learning. For example, the strategic use of code-switching between a student's native language ("NL") and non-native language or non-native languages ("NNL") in instruction, may serve multiple pedagogic functions across lexical, cultural, and cross-linguistic dimensions, and could enhance a student's bilingual development and learning efficacy. This may be a particularly effective strategy when instructing low proficient language learners. For these reasons, computational tools for automatically processing code-switched conversations may provide an important pedagogic aid for teachers and learners in classrooms, and potentially even enhance learning at scale and personalized learning.

SUMMARY

Systems and methods are provided for identifying at least one of a person's NL or NNL based on code-switched text and/or speech. For example, in an exemplary method, a LID system, comprising at least one machine learner, is provided. The at least one machine learner may be trained to identify at least one of a person's NL or NNL(s). For instance, the at least machine learner may be trained by: selecting at least one corpus of code-switched human-human dialog, human-machine dialog, and/or monolog, the corpus comprising a first set of code-switched text in the person's NL and NNL; extracting a first set of text features from the first set of code-switched text; and using the first set of text features and a per-word language identity of the first set of code-switched text to train the at least one machine learner. A second set of code-switched text may be received from the person. A second set of text features may be extracted from the second set of code-switched text. The second set of text features may be fed into the at least one machine learner to identify at least one of the person's NL or NNL.

As another exemplary method, a LID system, comprising at least one machine learner, may be provided. The at least one machine learner may be trained by: selecting at least one corpus of code-switched human-human dialog, human-machine dialog, and/or monolog, the corpus comprising a first set of code-switched speech in the person's NL and NNL; segmenting the first set of code-switched speech; converting the speech segments into acoustic feature vectors; training a first at least one machine learner using the acoustic feature vectors; generating at least one transformation matrix using the first at least one machine learner; extracting an i-Vector from the acoustic feature vectors for each speech segment; generating a language-dependent mean i-Vector using the i-Vectors extracted from each speech segment; transforming the language-dependent mean i-Vector using the at least one transformation matrix; extracting a first set of LID features from the speech segments using the transformed i-Vector; and training a second at least one machine learner using the first set of LID features. A second set of code-switched speech may be received from the person. The second set of code-switched speech may be segmented. A second set of LID features may be extracted from the segments of the second set of code-switched speech. The second set of LID features may be fed into the second at least one machine learner to identify at least one of the person's NL or NNL.

As yet another example, a system of identifying at least one of a person's NL or NNL based on code-switched text, may be provided. The system may comprise one or more data processors and a non-transitory computer-readable medium encoded with instructions for commanding the one or more data processors to execute steps of a process. The process may comprise providing a LID system including at least one machine learner. Training the at least one machine learner to identify at least one of the person's NL or NNL by: selecting at least one corpus of code-switched human-human dialog, human-machine dialog, and/or monolog, the corpus comprising a first set of code-switched text in the person's NL and NNL; extracting a first set of text features from the first set of code-switched text; and using the first set of text features and a per-word language identity of the first set of code-switched text to train the at least one machine learner. A second set of code-switched text may be received from the person. A second set of text features may be extracted from the second set of code-switched text. The second set of text features may be fed into the at least one machine learner to identify at least one of the person's NL or NNE As yet another example, a system of identifying at least one of a person's NL or NNL based on code-switched speech, may be provided. The system may comprise one or more data processors and a non-transitory computer-readable medium encoded with instructions for commanding the one or more data processors to execute steps of a process. The process may comprise providing a LID system, including at least one machine learner. The at least one machine learner may be trained by: selecting at least one corpus of code-switched human-human dialog, human-machine dialog, and/or monolog, the corpus comprising a first set of code-switched speech in the person's NL and NNL; segmenting the first set of code-switched speech; converting the speech segments into acoustic feature vectors; training a first at least one machine learner using the acoustic feature vectors; generating at least one transformation matrix using the first at least one machine learner; extracting an i-Vector from the acoustic feature vectors for each speech segment; generating a language-dependent mean i-Vector using the i-Vectors extracted from each speech segment; transforming the language-dependent mean i-Vector using the at least one transformation matrix; extracting a first set of LID features from the speech segments using the transformed i-Vector; and training a second at least one machine learner using the first set of LID features. A second set of code-switched speech may be received from the person. The second set of code-switched speech may be segmented. A second set of LID features may be extracted from the segments of the second set of code-switched speech. The second set of LID features may be fed into the second at least one machine learner to identify at least one of the person's NL or NNL.

DETAILED DESCRIPTION

Systems and methods as described herein provide an improved approach of LID in code-switched text and speech.

Automated processing of code-switched text and speech poses challenging problems. This is so because the difficulties that may be observed during traditional dialog processing tasks such as automatic speech recognition ("ASR"), spoken language understanding, natural language generation, and dialog management ("DM") may be exacerbated in the case of code-switched dialog in which the language the person is using at any given instant may not be known. For example, non-native English language learners, from various NL backgrounds, may tend to use their NL as a "crutch" when writing or speaking in a NNL that they are learning, especially if they are a low proficiency learner, resulting in mixed-language speech. In such a case, LID becomes important not only for ASR, but also for DM, where the dialog designer or language expert may want the conversational agent to perform different dialog actions depending on whether the speaker is using his or her NL alone, the NNL alone, or a mixture of both during a conversational turn.

Integrating an explicit LID step (or LID system) into an ASR module may alleviate the above-noted issues and improve user experience. Although integrating a LID step (or LID system) into an ASR module may be efficient when concerned with only a few language pairs, as code-switched dialog systems are scaled to include more language pairs, constructing ASRs for each of the languages involved may become difficult. Accordingly, it may be advantageous to provide an ASR-free approach to LID in code-switched dialog.

Language Identification from Text

Figure 1A:
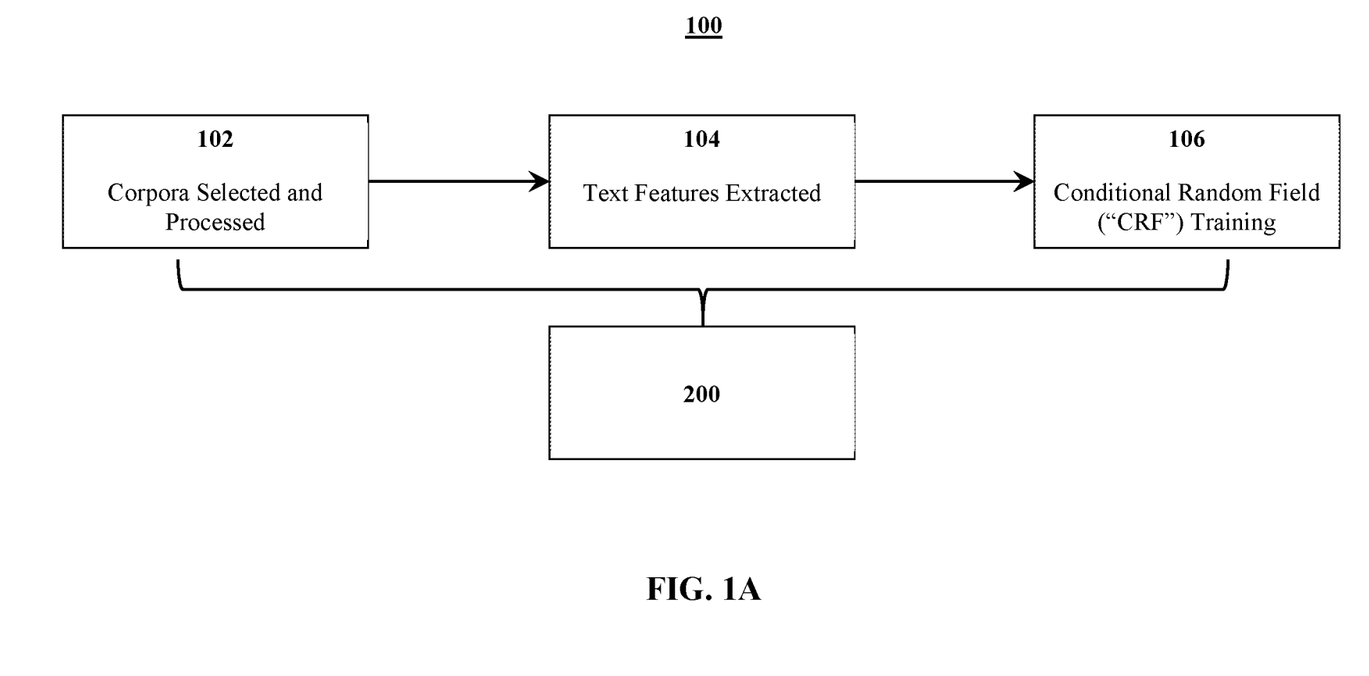
FIG. 1A is a diagram depicting a method of training a system for identifying a person's native language and/or non-native language from code-switched text.

FIG. 1A is a diagram depicting an exemplary method 100 of training a system 200 to identify a person's NL and/or NNL(s) in code-switched text. A corpus or corpora of code-switched human-human dialog, human-machine dialog, and/or monolog, including audio and accompanying transcripts, may be selected and processed (Step 102). For example, the Bangor Miami corpus of code-switched human-human dialog in English and Spanish may be used. The transcripts may include beginning and end times of utterances and a per-word language identity. Turns containing tokens with ambiguous or undetermined language may be excluded.

The audio from the corpora may be split into turns as specified by the timestamps provided in the transcripts. Each turn may be downsampled to, for example, 8 kHz and converted to a single channel. The transcripts may be processed by performing whitespace tokenization on each turn, and removing event descriptions and unintelligible tokens. Additionally or alternatively, voice activity detection may be performed to separate speech from non-speech, e.g., silence, background noise, etc., within the corpora.

Text features, for example, low-level binary text features, may be extracted from the corpora (Step 104). The text features may capture the presence or absence of features, such as: (i) word n-grams, e.g., unigrams, bigrams (or digrams), etc.; (ii) character n-grams, e.g., $1 \leq n \leq 4$; and (iii) character prefixes/suffixes, e.g., all affixes with a length $\leq 3$. The character n-grams may be extracted without crossing word-boundaries.

The extracted text features and the per-word language identity from the transcripts may be used to train, i.e., parameter learning, a conditional random field ("CRF") (Step 106). As will be discussed in more detail below, the CRF may be used to make word-level language identifications, and aggregate them to form respective turn-level language identifications. It should be appreciated that in addition to or in lieu of the use of a CRF, the text features may be aggregated and used to train a variety of other machine "learners," e.g., logistic regression, deep neural networks, etc., which may be used to make word- or turn-level language identifications.

Figure 1B:
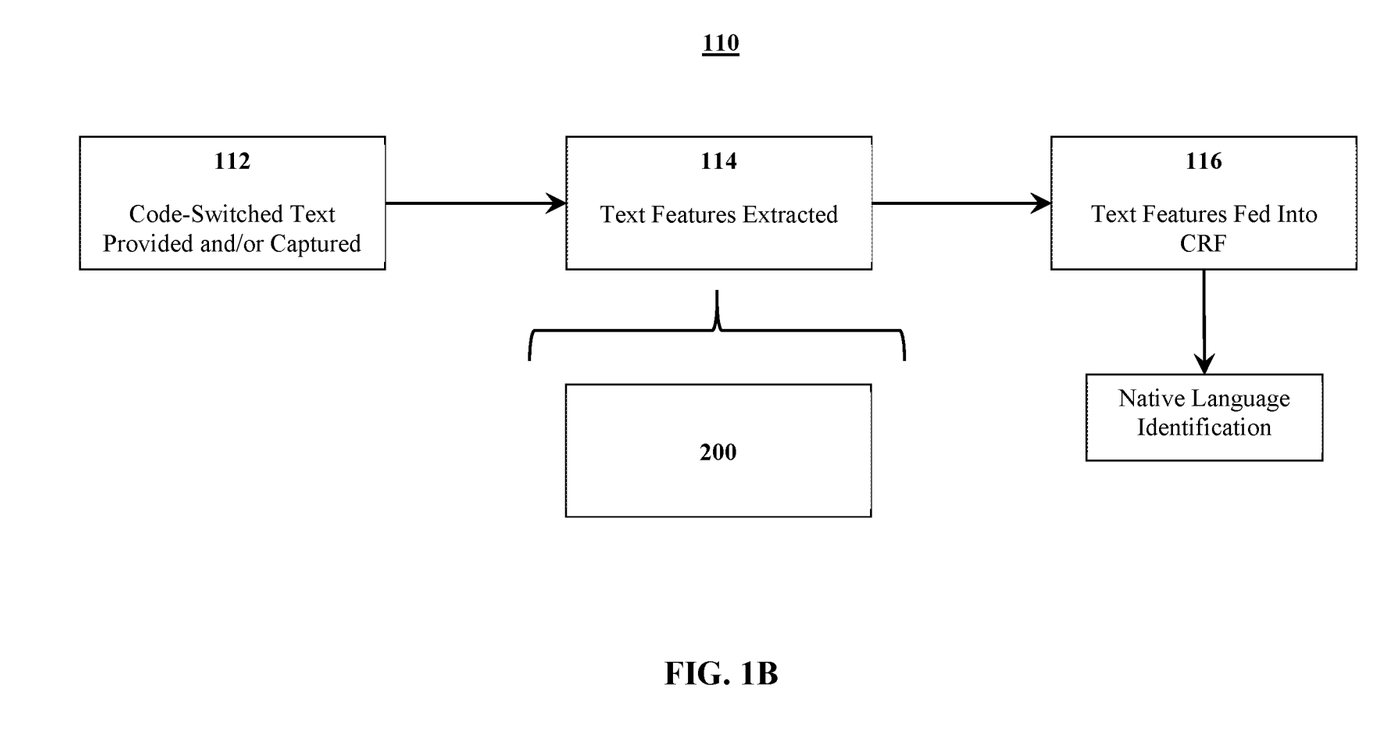
FIG. 1B is a diagram depicting a method of identifying a person's native language and/or non-native language from code-switched text.

FIG. 1B is a diagram depicting an exemplary method 110 of identifying a person's NL and/or NNL(s) in code-switched text using the system 200. Code-switched text may be provided or captured by, for example, a student or language learner (Step 112). This code-switched text may be provided in any appropriate form, e.g., written response, essay, tweet, etc., and may be spontaneous or given in response to a particular prompt(s). Text features, including those used to train the CRF or other machine learner, may be extracted from the code-switched text (Step 114). These text features may be fed into the CRF or other machine learner, to identify the person's NL and/or NNL(s) (Step 116).

Language Identification from Speech

Figure 2A:
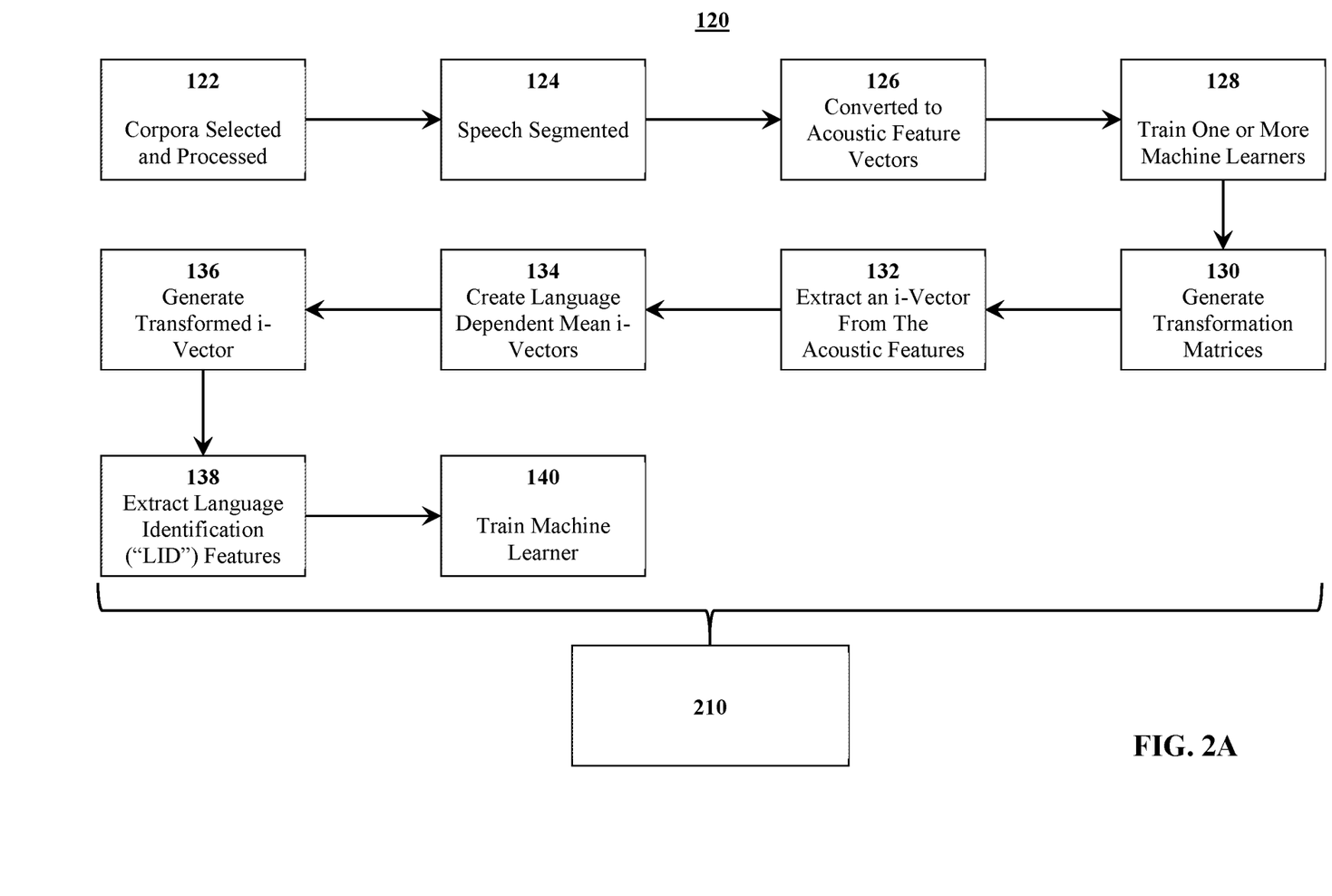
FIG. 2A is a diagram depicting a method of training a system for identifying a person's native language and/or non-native language from code-switched speech.

FIG. 2A is a diagram depicting an exemplary method 120 of training a system 210 and/or the system 200 to identify a person's NL and/or NNL(s) in code-switched speech. A corpus or corpora of code-switched human-human dialog, human-machine dialog, and/or monolog, including audio and accompanying transcripts, may be selected and processed as in Step 102 discussed above (Step 122). Optionally, a synthetic minority oversampling technique ("SMOTE") may also be employed to overcome any imbalance between NL and NNL speech within the corpora, ensuring that each is substantially equally represented. If a SMOTE is used, it may be advantageous to not oversample code-switched turns.

The speech from the corpora may be segmented into sequences of appropriate length, e.g., two-second segments (Step 124). These speech segments may be converted into acoustic feature vectors, e.g., Mel Frequency Cepstral Coefficient ("MFCC") vectors (Step 126). The MFCC vectors may be used to train one or more machine learners, e.g., a Gaussian mixture model ("GMM"), a linear discriminant analysis ("LDA") classifier, a probabilistic linear discriminant analysis ("PLDA") classifier, etc. (Step 128). The trained machine learners may be used to generate one or more transformation matrices, e.g., a LDA transformation matrix, a PLDA transformation matrix, etc. (Step 130).

An i-Vector may also be extracted from the MFCC vectors for each speech segment (Step 132). For example, among other methods, the i-Vector may be extracted by: (i) training one or more machine learners as universal background models using the corpora; (ii) extracting sufficient statistics from the corpora; (iii) estimating one or more total variability matrices ("T-matrix") from the sufficient statistics; and (iv) generating an i-Vector for each speech segment, e.g., an 800-dimensional i-Vector. The speech segment i-Vectors may be averaged to generate a language-dependent mean i-Vector (Step 134).

The transformation matrices generated at Step 130 may be used to transform the language-dependent mean i-Vector generated at Step 134 into a transformed i-vector (Step 136). Using this transformed i-Vector, LID features may be extracted from the speech segments (Step 138). Namely, for each speech-segment, a three-dimensional vector may be generated, by extracting: (i) the Euclidean or Cosine distance of the segment from the average NL segment; (ii) the Euclidean or Cosine distance from the average NNL segment; and (iii) the length of the turn in seconds. A LDA score and/or a PLDA score may be extracted for each speech segment, in addition to or in lieu of the Euclidean or Cosine distances. These LID features may be used to train an appropriate machine learner, e.g., a LDA classifier, a PLDA classifier, etc. (Step 140). As will be discussed in more detail below, these machine learners may be used to make turn-level language identifications.

Figure 2B:
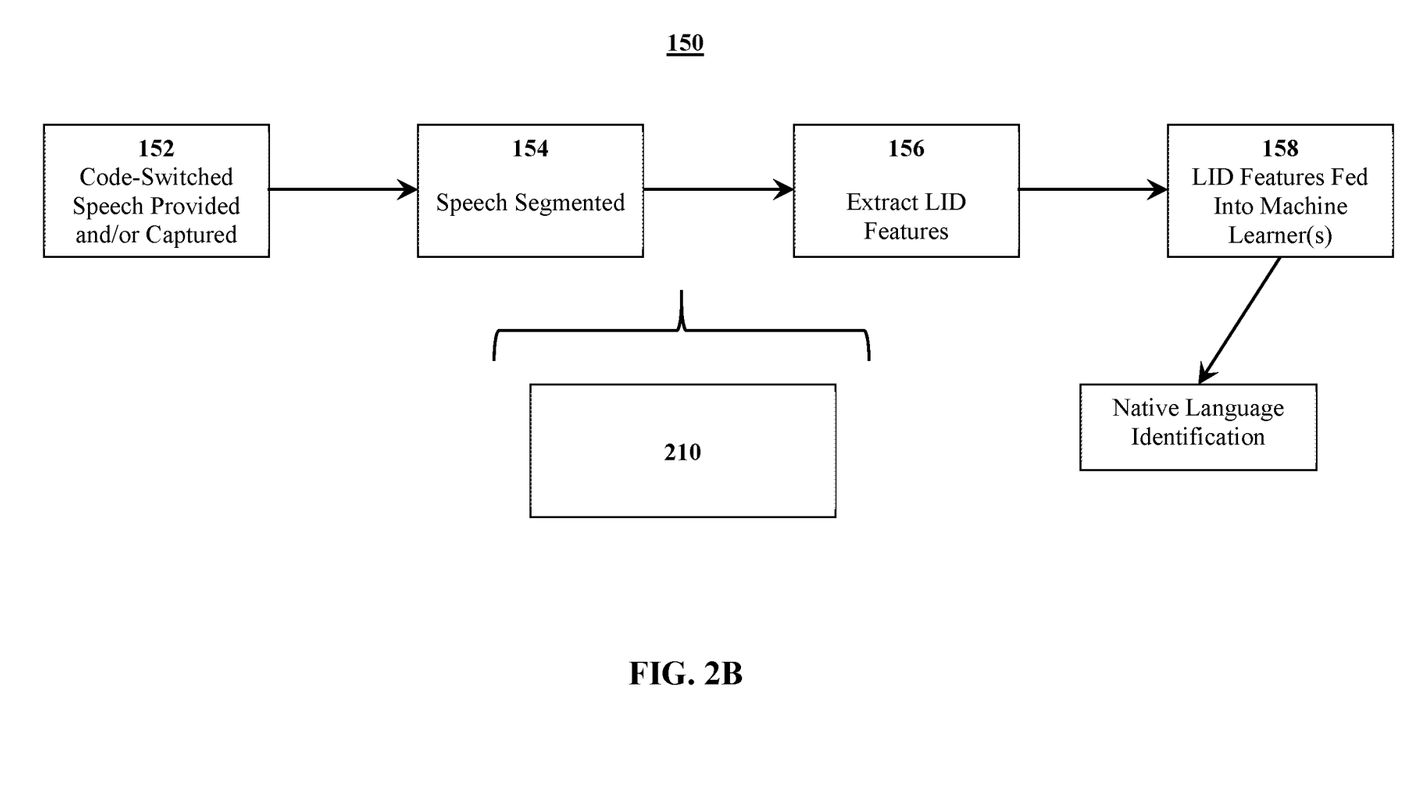
FIG. 2B is a diagram depicting a method of identifying a person's native language and/or non-native language from code-switched speech.

FIG. 2B is a diagram depicting an exemplary method 150 of identifying a person's NL and/or NNL(s) in code-switched speech using the system 210. Code-switched speech may be provided by, for example, a student or language learner (Step 152). This code-switched speech may be provided and captured or recorded in any appropriate manner, e.g., microphone, camera, etc., and may be spontaneous or given in response to a particular prompt(s). The speech may be segmented into sequences of appropriate length, e.g., two-second segments (Step 154). Using the transformed i-Vector generated at Step 136, LID features (as in Step 138) may be extracted from the speech segments (Step 156). These LID features may be fed into the machine learner trained at Step 140 to identify the person's NL and/or NNL (Step 158).

It should be appreciated that the systems and methods described above may be maintained or performed independently or in combination to make independent and/or shared predictions based on the speech and text of a given corpus or corpora. It should also be appreciated that although certain advantages may be provided by an ASR-free approach to LID in code-switched dialog, the systems and methods described above may include an ASR to further improve the systems' accuracy in predicting a person's NL and/or NNL.

Having identified the person's NL and/or NNL(s), one of any number of steps may then be performed based on the particular NL or NNL(s). For example, if a person provides a response to an automated answering service, the answering service may provide the person with the choice of interacting with the answering service in his or her NL. Additionally or alternatively, the answering service may route the person to a representative that is fluent in his or her NL. As yet another example, if a person provides a response to an automated testing system, the testing system may provide the person with the choice of taking the test in his or her NL. The systems 200, 210 and methods 100, 110, 120, 150 may also be used in screening procedures, e.g., pre-employment screening.

Figure 3A:
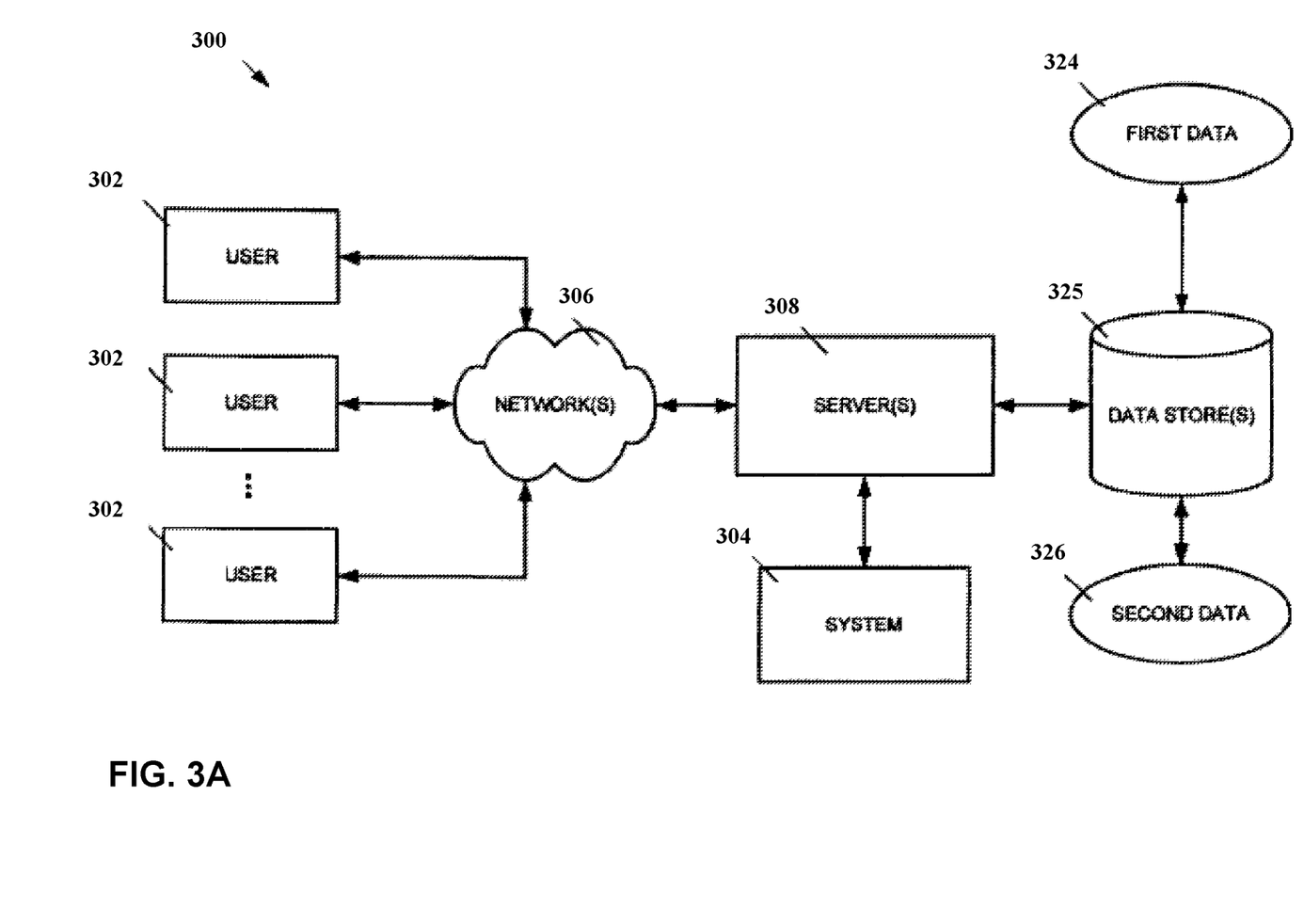
FIGS. 3A, 3B, 3C, and 3D depict exemplary systems for implementing various aspects described herein.

FIG. 3A depicts a computer-implemented environment 300 wherein users 302 can interact with a system 304, e.g., system 200, 210, hosted on one or more servers 308 through one or more networks 306. The system 304 contains software operations or routines. The users 302 can interact with the system 304 in a number of ways, such as over the one or more networks 306. The one or more servers 308 accessible through the network(s) 306 can host system 304. It should be understood that the system 304 could also be provided on a stand-alone computer for access by a user.

Figure 3B:
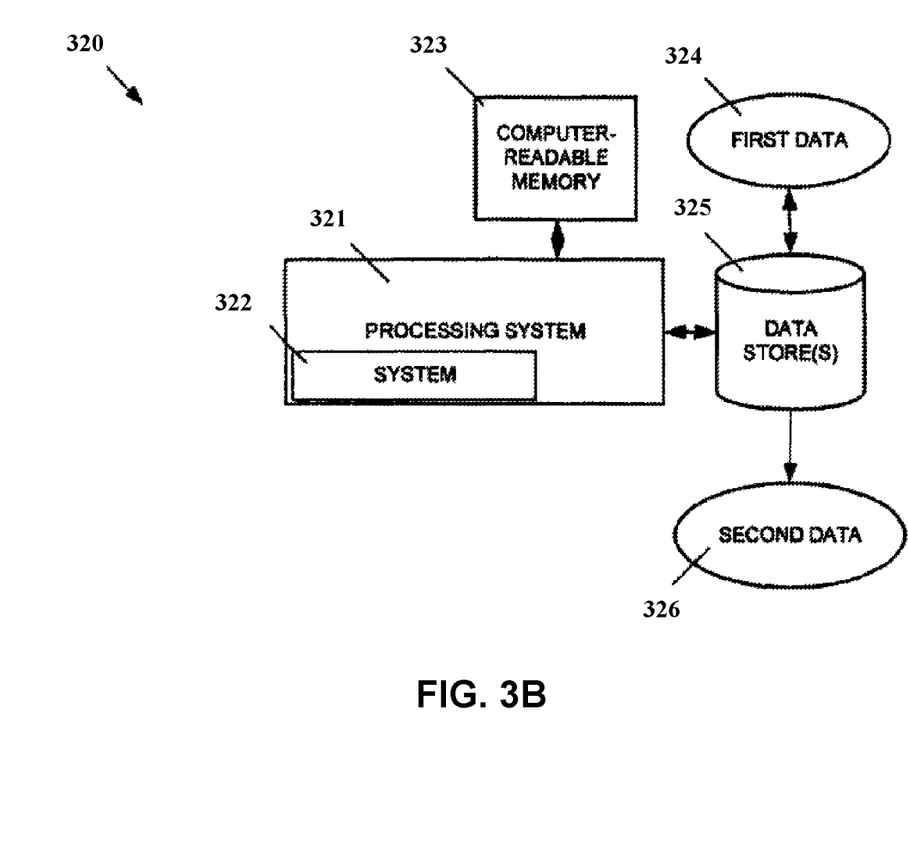
Figure 3C:
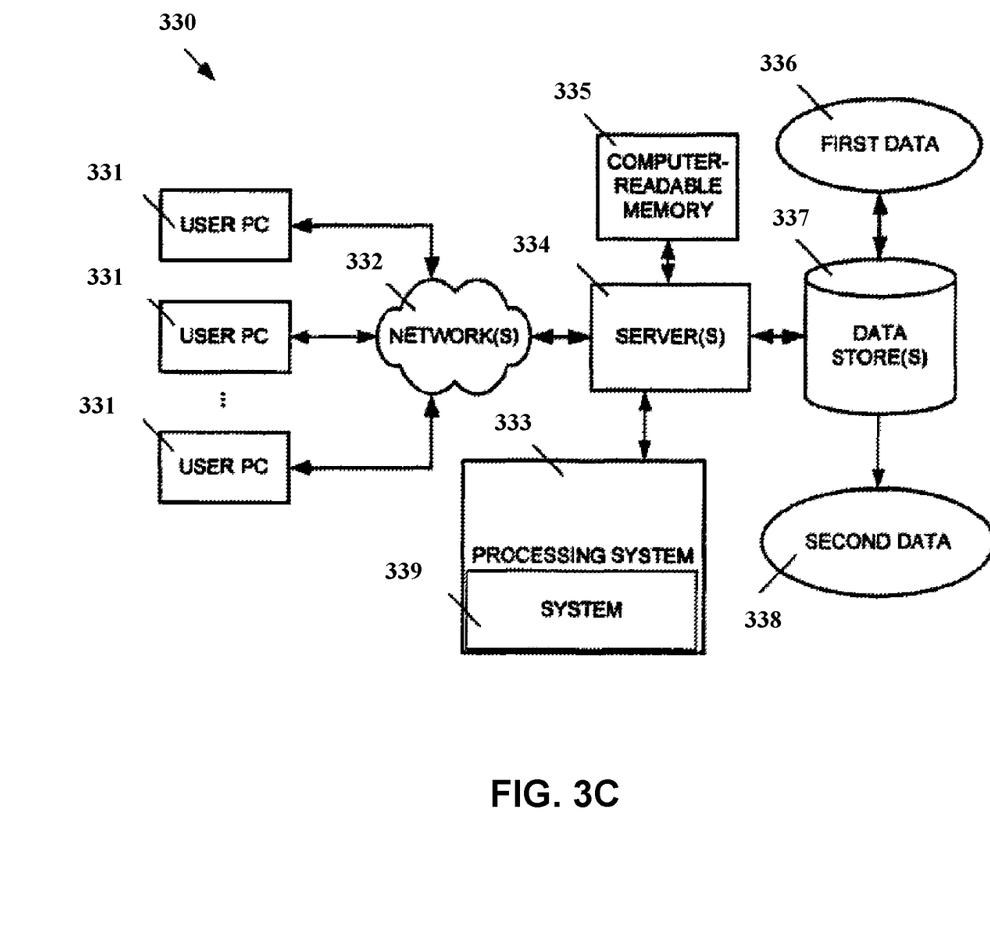
Figure 3D:
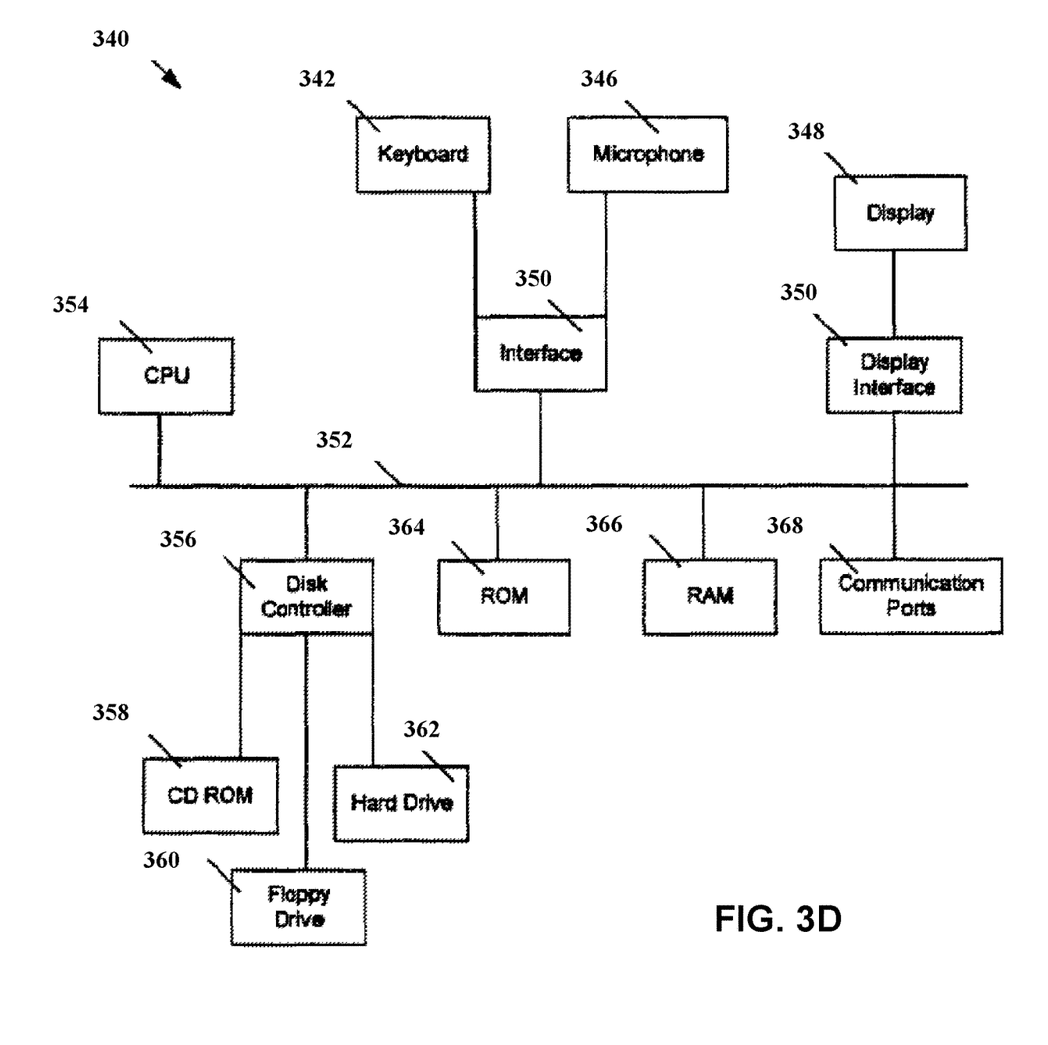

FIGS. 3B, 3C and 3D depict example systems for use in implementing a system. For example, FIG. 3B depicts an exemplary system 320, e.g., system 200, 210, that includes a standalone computer architecture where a processing system 321, e.g., one or more computer processors, includes a system 322 being executed on it. The processing system 321 has access to a non-transitory computer-readable memory 323 in addition to one or more data stores 325. The one or more data stores 325 may contain first data 324 as well as second data 326.

FIG. 3C depicts a system 330, e.g., system 200, 210, that includes a client server architecture. One or more user PCs 331 accesses one or more servers 334 running a system 339 on a processing system 333 via one or more networks 332. The one or more servers 334 may access a non-transitory computer readable memory 335 as well as one or more data stores 337. The one or more data stores 337 may contain first data 336 as well as second data 338.

FIG. 3D shows a block diagram of exemplary hardware for a standalone computer architecture 340, such as the architecture depicted in FIG. 3B, that may be used to contain and/or implement the program instructions of system embodiments of the present disclosure. A bus 352 may serve as the information highway interconnecting the other illustrated components of the hardware. A processing system 354 labeled CPU (central processing unit), e.g., one or more computer processors, may perform calculations and logic operations required to execute a program. A non-transitory computer-readable storage medium, such as read only memory (ROM) 364 and random access memory (RAM) 366, may be in communication with the processing system 354 and may contain one or more programming instructions. Optionally, program instructions may be stored on a non-transitory computer-readable storage medium such as a magnetic disk, optical disk, recordable memory device, flash memory or other physical storage medium. Computer instructions may also be communicated via a communications signal or a modulated carrier wave, e.g., such that the instructions may then be stored on a non-transitory computer-readable storage medium.

A disk controller 356 interfaces one or more optional disk drives to the system bus 352. These disk drives may be external or internal floppy disk drives 360, external or internal CD-ROM, CD-R, CD-RW or DVD drives 358, or external or internal hard drives 362. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 356, the ROM 364 and/or the RAM 366. Preferably, the processor 354 may access each component as required.

A display interface 350 may permit information from the bus 352 to be displayed on a display 348 in audio, graphic or alphanumeric format. Communication with external devices may optionally occur using various communication ports 368.

In addition to the standard computer-type components, the hardware may also include data input devices, such as a keyboard 342 or other input device such as a microphone, camera, etc. 346.

This written description describes exemplary embodiments of the present disclosure, but other variations fall within the scope of the disclosure. For example, the systems and methods may include and utilize data signals conveyed via networks, e.g., local area network, wide area network, internet, combinations thereof, etc., fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code or any other stored data that is operable to cause a processing system to perform the methods and operations described herein. Any suitable computer languages may be used such as C, C++, Java, Python, etc., as will be appreciated by those skilled in the art. Other implementations may also be used, however, such as firmware or even appropriately designed hardware configured to carry out the methods and systems described herein.

The systems' and methods' data, e.g., associations, mappings, data input, data output, intermediate data results, final data results, etc., may be stored and implemented in one or more different types of computer-implemented data stores, such as different types of storage devices and programming constructs, e.g., RAM, ROM, Flash memory, flat files, databases, programming data structures, programming variables, IF-THEN (or similar type) statement constructs, etc. It is noted that data structures describe formats for use in organizing and storing data in databases, programs, memory or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method of identifying at least one of a person's native language (NL) or non-native languages (NNL) based on code-switched speech, the method comprising:
    providing a language identification (LID) system, the LID system comprising at least one machine learner;
    training the at least one machine learner to identify at least one of the person's NL or NNL, wherein the step of training the at least one machine learner comprises:
    selecting at least one corpus of code-switched dialog or monolog, the corpus comprising a first set of code-switched speech in the person's NL and NNL;
    segmenting the first set of code-switched speech;
    converting the speech segments into acoustic feature vectors;
    training a first at least one machine learner using the acoustic feature vectors;
    generating at least one transformation matrix using the first at least one machine learner;
    extracting an i-Vector from the acoustic feature vectors for each speech segment;
    generating a language-dependent mean i-Vector using the i-Vectors extracted from each speech segment;
    transforming the language-dependent mean i-Vector using the at least one transformation matrix;
    extracting a first set of LID features from the speech segments using the transformed i-Vector;
    training a second at least one machine learner using the first set of LID features;
    receiving a second set of code-switched speech from the person as part of a computer-implemented automated testing system initially operating in a first language corresponding to a NNL of the person;
    segmenting the second set of code-switched speech;
    extracting a second set of LID features from the speech segments of the second set of code-switched speech;
    feeding the second set of LID features into the second at least one machine learner to identify at least one of the person's NL or NNL; and
    causing the computer-implemented automated testing system to initiate a computer-based test in a second language corresponding to the NL of the person.

2. The method of claim 1, wherein the step of training the at least one machine learner comprises using a synthetic minority oversampling technique to balance the NL and NNL speech of the at least one corpus.

3. The method of claim 1, wherein the acoustic feature vectors comprise Mel Frequency Cepstral Coefficient vectors.

4. The method of claim 1, wherein the first at least one machine learner and the second at least one machine learner each comprise at least one of a Gaussian mixture model, a linear discriminant analysis classifier, or a probabilistic linear discriminant analysis classifier.

5. The method of claim 1, wherein the step of extracting an i-Vector from the acoustic feature vectors comprises:
    providing a universal background model using the at least one corpus;
    extracting sufficient statistics from the at least one corpus;

estimating at least one total variability matrix (T-matrix) from the sufficient statistics; and generating the i-Vector from the at least one T-matrix.

6. The method of claim 1, wherein the first set of LID features comprise a Euclidean distance of each speech segment from the average NL segment, a Euclidean distance of each speech segment from the average NNL segment, and a duration of each speech segment.

7. The method of claim 1, wherein the first set of LID features comprise a Cosine distance of each speech segment from the average NL segment, a Cosine distance of each speech segment from the average NNL segment, and a duration of each speech segment.

8. The method of claim 1, wherein the first set of LID features comprise at least one of a linear discriminant analysis score or a probabilistic linear discriminant analysis score for each speech segment.

\* \* \* \* \*